US008295623B2

(12) United States Patent
Laroche et al.

(10) Patent No.: US 8,295,623 B2
(45) Date of Patent: Oct. 23, 2012

(54) ENCODING AND DECODING WITH ELIMINATION OF ONE OR MORE PREDETERMINED PREDICTORS

(75) Inventors: Guillaume Laroche, Rennes (FR); Joël Jung, Le Mesnil Saint-Denis (FR)

(73) Assignee: France Telecom, Paris (FR)

( * ) Notice: Subject to any disclaimer, the term of this patent is extended or adjusted under 35 U.S.C. 154(b) by 74 days.

(21) Appl. No.: 13/123,304

(22) PCT Filed: Oct. 12, 2009

(86) PCT No.: PCT/FR2009/051937
§ 371 (c)(1),
(2), (4) Date: Apr. 8, 2011

(87) PCT Pub. No.: WO2010/043806
PCT Pub. Date: Apr. 22, 2010

(65) Prior Publication Data
US 2011/0194784 A1    Aug. 11, 2011

(30) Foreign Application Priority Data

Oct. 14, 2008 (FR) ..................................... 08 56949

(51) Int. Cl.
*G06K 9/36* (2006.01)
*G06K 9/46* (2006.01)
(52) U.S. Cl. ..................................................... 382/238
(58) Field of Classification Search .......... 382/218–220, 382/232, 233, 238, 250, 251; 375/240.1, 375/240.12, 240.16, 245, E7.105, E7.125, 375/E7.265; 348/416.1, E7.026, E7.082
See application file for complete search history.

(56) References Cited

U.S. PATENT DOCUMENTS 3,980,830 A * 9/1976 Wendland et al. ......... 375/240.1
4,232,338 A * 11/1980 Netravali et al. ........... 348/416.1
4,255,763 A * 3/1981 Maxemchuk et al. ... 375/240.12
(Continued)

FOREIGN PATENT DOCUMENTS
EP    1 770 639 A2    4/2007

OTHER PUBLICATIONS

Pan et al., "A directional field based fast intra mode decision algorithm for H.264 video coding," 2004 IEEE International Conference on Multimedia and Expo, 2004, ICME'04, Piscataway, NJ, USA, vol. 2, pp. 1147-1150 (Jun. 27, 2004).

(Continued)

*Primary Examiner* — Amir Alavi
(74) *Attorney, Agent, or Firm* — Drinker Biddle & Reath LLP

(57) ABSTRACT

A method is provided for encoding an image or a sequence of images generating a data flow comprising data representing a group of pixels in one of said images, said method including: calculating a predetermined number of predictors in relation to said group of pixels, and selecting an optimal predictor in accordance with a predetermined selection criterion. Between the calculation and selection steps, a step of eliminating at least one predictor with a calculated predetermined number is performed, which comprises, for at least two $i^{th}$ (Pi) and $j^{th}$ (Pj) predictors, of: calculating the difference between said $j^{th}$ and $i^{th}$ predictors, applying a transform to said calculated difference, performing a quantification operation on the result of the applied transform, comparing the result of said quantification operation with a predetermined value, eliminating the $j^{th}$ predictor if the result of said quantification operation is less than or equal to said predetermined value.

12 Claims, 6 Drawing Sheets

U.S. PATENT DOCUMENTS

| | | | |
|---|---|---|---|
| 4,593,398 A * | 6/1986 | Millar | 375/245 |
| 2006/0120456 A1 | 6/2006 | Tasaka et al. | |
| 2010/0329361 A1 * | 12/2010 | Choi et al. | 375/240.29 |
| 2011/0194784 A1 * | 8/2011 | Laroche et al. | 382/238 |
| 2012/0177124 A1 * | 7/2012 | Laroche et al. | 375/240.16 |

OTHER PUBLICATIONS

Pan et al., "A Fast Mode Decision Algorithm for H.264/AVC Intra Prediction," 2007 IEEE Workshop on Signal Processing Systems, IEEE, PI, pp. 704-709 (Oct. 1, 2007).

* cited by examiner

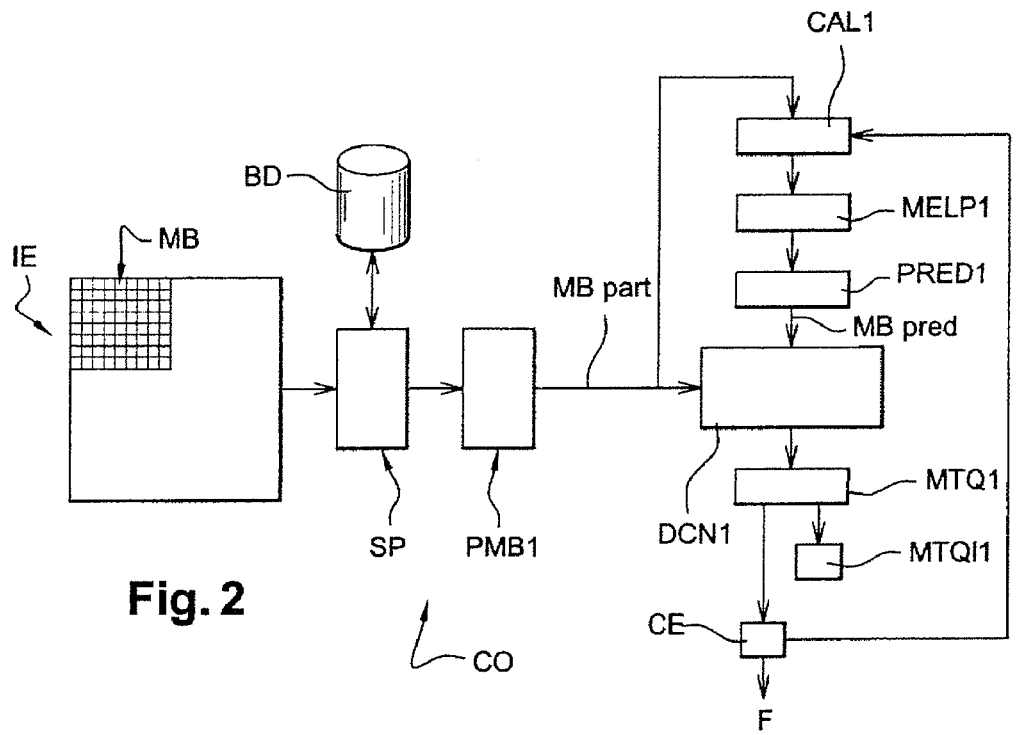
Fig. 2
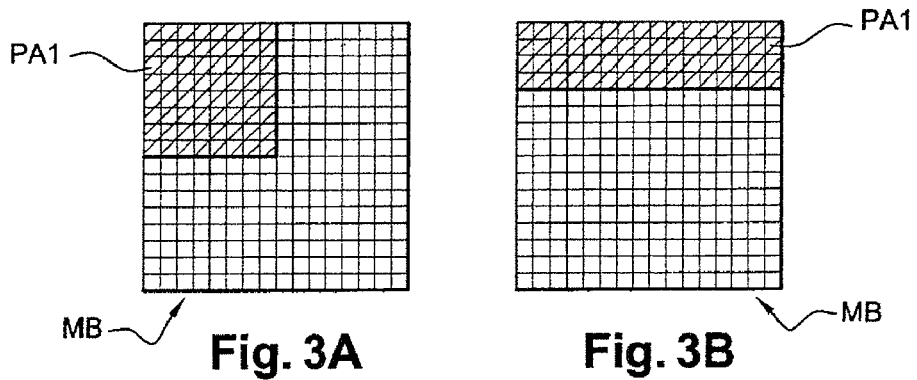
Fig. 3A  Fig. 3B
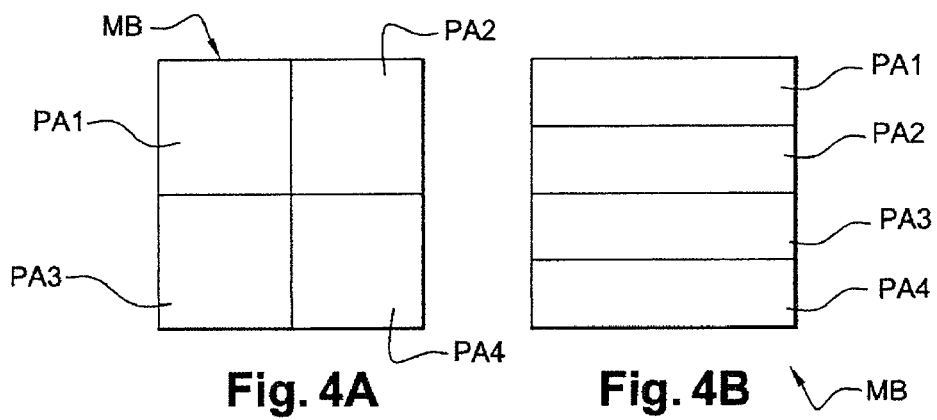
Fig. 4A  Fig. 4B

ENCODING AND DECODING WITH ELIMINATION OF ONE OR MORE PREDETERMINED PREDICTORS

CROSS-REFERENCE TO RELATED APPLICATIONS

This application is the U.S. national phase of the International Patent Application No. PCT/FR2009/051937 filed Oct. 12, 2009, which claims the benefit of French Application No. 08 56949 filed Oct. 14, 2008, the entire content of which is incorporated herein by reference.

BACKGROUND OF THE INVENTION

The present invention relates generally to the field of image processing, and more specifically to the coding and decoding by competition between digital images and between digital image sequences.

There are a number of coding and decoding methods for transmitting images. Major coding types can notably be distinguished, such as the so-called "intra" coding in which an image is coded independently, that is to say without reference to other images, or else the so-called "inter" coding which consists in coding a current image in relation to past images so as to express and transmit only the difference between these images.

The coding methods of the abovementioned type generally comprise a predictive coding step in which groups of pixels, called blocks or macroblocks, of a current image are predicted relative to other reference blocks or macroblocks, that is to say blocks or macroblocks that have been previously coded then decoded.

In the case, for example, of the standard H264/MPEG-4 AVC (AVC standing for "Advanced Video Coding"), the predictive coding of a macroblock consists in subdividing the macroblocks according to a plurality of partitions that generally have the form of smaller blocks.

In the case of the 16×16 Intra coding, the macroblock is considered as a unique partition which is predicted relative to a set of four spatial predictors. In the case of the 8×8 or 4×4 Intra coding, each smaller block is predicted relative to a set of nine spatial predictors comprising the four spatial predictors used in the 16×16 Intra coding.

In the case of the inter coding, the macroblock may be partitioned according to the 16×16, 8×16, 16×8 and 8×8 modes. If the 8×8 mode is selected, each 8×8 block is once again partitioned according to the 8×8, 4×8, 8×4 and 4×4 modes. Each current block is compared to one or more blocks of one or more reference images. A temporal predictor is then defined by a vector which describes the movement between the current block and the reference block. If, for example, a macroblock is partitioned in 16 blocks (4×4 mode), 24 displacement vectors will be coded. Such inter coding may moreover be refined by splitting the displacement vector in order to achieve a precision which, beyond an entire pixel, can be extended to the half-pixel, to the quarter pixel, or even to the eighth pixel.

The competition-based intra or inter coding, as implemented in the H264/AVC standard, thus relies on having the abovementioned various predictors compete, whether they are of spatial or temporal type, in order to select the best predictor, that is to say, the predictor which will optimize the coding of the block concerned according to a predetermined criterion, for example the bit rate/distortion cost.

One drawback to such a predictive coding lies in the large number of predictors offered and it has been found that some codings made to compete are very similar for certain image contents and certain bit rates used, which unnecessarily increases the bit rate of the competition information induced by these multiple predictors.

Another drawback in such a predictive coding lies in the fact that the calculation of a selection criterion, such as the bit rate/distortion cost, is performed for the set of predictors and is therefore an intensive consumer in terms of central processing unit computation power and processing time.

OBJECT AND SUMMARY OF THE INVENTION

One of the aims of the invention is to remedy drawbacks in the abovementioned prior art.

To this end, a subject of the present invention relates to a method of coding an image or a sequence of images generating a data stream comprising data representative of at least one group of pixels in one of the images, such a method comprising the steps of:
  calculating a predetermined number of predictors in relation to the group of pixels,
  selecting an optimum predictor relative to a predetermined criterion of choice.

The method according to the invention is noteworthy in that it comprises, between the calculation and selection steps, a step of eliminating at least one predictor from the calculated predetermined number, which consists, for at least two ith and jth predictors, in:
  calculating the difference between the jth and ith predictors,
  applying a transform to the calculated difference, performing a quantization operation on the result of the applied transform,
  comparing the result of the quantization operation to a predetermined value,
  eliminating the jth predictor in the case where the result of the quantization operation is less than or equal to the predetermined value.

Such an arrangement therefore makes it possible to use fewer predictors for the coding of the blocks and thus satisfactorily reduce the bit rate of the abovementioned competition information.

Moreover, such an arrangement advantageously makes it possible to define an optimum criterion for eliminating predictors which does not depend on the original image to be coded. Consequently, such an elimination criterion, when it is adopted at the coder level, is reproducible at the decoder level.

Such an arrangement finally makes it possible, by virtue of the elimination of one or more predetermined predictors, to obtain a coding suited to the content of the predictors and to the various contents of the image.

Correspondingly, the invention also relates to the decoding of a data stream representative of an image or of a sequence of images, the stream comprising data representative of at least one group of pixels in one of the images, such a decoding method comprising the steps of:
  reading an optimum predictor index contained in the stream, the index being a function of a predetermined number of predictors in relation to the group of pixels,
  calculating the optimum predictor from the index read.

Such a decoding is noteworthy in that, prior to the reading step, it comprises the steps consisting in:
  calculating the predetermined number of predictors,
  for at least two ith and jth predictors, calculating the difference between the jth and ith predictors,
  applying a transform to the calculated difference, performing a quantization operation on the result of the applied transform, comparing the result of the quantization operation to a predetermined value, eliminating the jth predictor in the case where the result of the quantization operation is less than or equal to the predetermined value, so that the optimum predictor index read during the reading step is a function of a reduced number of predictors.

According to an advantageous feature of the abovementioned coding and decoding methods, the quantization operation is determined according to a criterion for optimizing the number of predictors to be eliminated.

Such an arrangement thus makes it possible to adapt on the fly, that is to say, macroblock after macroblock of a current image to be coded (respectively decoded), the operation for quantizing the transform for the difference between the jth and ith predictors, in order to obtain, for each macroblock, an optimum elimination of the number of predictors.

According to another advantageous feature of the abovementioned coding and decoding methods, the quantization operation uses, as parameter, the quantization step which is itself used by a quantization operation performed during the coding and decoding.

Such an arrangement makes it possible, by virtue of the elimination of one or more predetermined predictors, to obtain a coding of the predictor indices suited to the content of the predictors and to the various contents of the image.

According to yet another advantageous feature of the abovementioned coding and decoding methods, the predictors are of spatial or temporal type.

Such an arrangement thus makes it possible to implement the elimination of the predictors both for the intra coding (respectively decoding) and for the inter coding (respectively decoding).

The invention also relates to a device for coding an image or a sequence of images generating a data stream comprising data representative of at least one group of pixels in one of the images, such a device comprising:

a module for calculating a predetermined number of predictors in relation to the group of pixels, a decision module for determining an optimum predictor relative to a predetermined criterion of choice.

Such a device is noteworthy in that it also comprises:

a module for eliminating at least one predictor from the predetermined number which comprises calculation means for, relative to at least two ith and jth predictors:

determining the difference between the jth and ith predictors, applying a transform to the calculated difference, performing a quantization operation on the result of the applied transform, comparing the result of the quantization operation to a predetermined value, eliminating the jth predictor in the case where the result of the quantization operation is less than or equal to the predetermined value.

The invention also relates to a device for decoding a data stream representative of an image or of a sequence of images, the stream comprising data representative of at least one group of pixels in one of the images, such a device comprising:

a module for reading an optimum predictor index contained in the stream, the index being a function of a predetermined number of predictors in relation to the group of pixels, a module for calculating the optimum predictor from the index read.

Such a device is noteworthy in that it also comprises:

a module for calculating the predetermined number of predictors, a module for eliminating at least one predictor from the predetermined number which comprises:

calculation means for, relative to at least two ith and jth predictors:

determining the difference between the jth and ith predictors, applying a transform to the calculated difference, performing a quantization operation on the result of the applied transform, comparing the result of the quantization operation to a predetermined value, eliminating the jth predictor in the case where the result of the quantization operation is less than or equal to the predetermined value, transmission means for transmitting the reduced predetermined number of predictors obtained to said read module.

The invention also relates to a computer program comprising instructions for implementing one of the methods according to the invention, when it is executed on a computer.

BRIEF DESCRIPTION OF THE DRAWINGS

Other features and advantages will become apparent on reading two preferred embodiments, described with reference to the figures in which:

FIG. 2 represents one embodiment of a coding device according to the invention,

FIG. 3 represents various forms of partitions likely to be selected in the coding device according to the invention, FIG. 4 represents macroblocks partitioned following the selection of the various initial partitions represented in FIG. 3.

DETAILED DESCRIPTION OF A FIRST EMBODIMENT

An embodiment of the invention will now be described, in which the coding method according to the invention is used to code a sequence of images according to a bit stream close to that obtained by a coding according to the H.264/MPEG-4 AVC standard. In this embodiment, the coding method according to the invention is, for example, implemented in software or hardware manner by modifying a coder initially conforming to the H.264/MPEG-4 AVC standard. The coding method according to the invention is represented in the form of an algorithm comprising steps C1 to C12 represented in FIG. 1.

It should be noted that the decoding method according to the invention is also implemented in software or hardware manner by modifying a decoder initially conforming to the H.264/MPEG-4 AVC standard.

According to the embodiment of the invention, the coding method according to the invention is implemented in a coding device CO represented in FIG. 2. The coding performed by the coder CO is, for example, of intra type.

Figure 1:
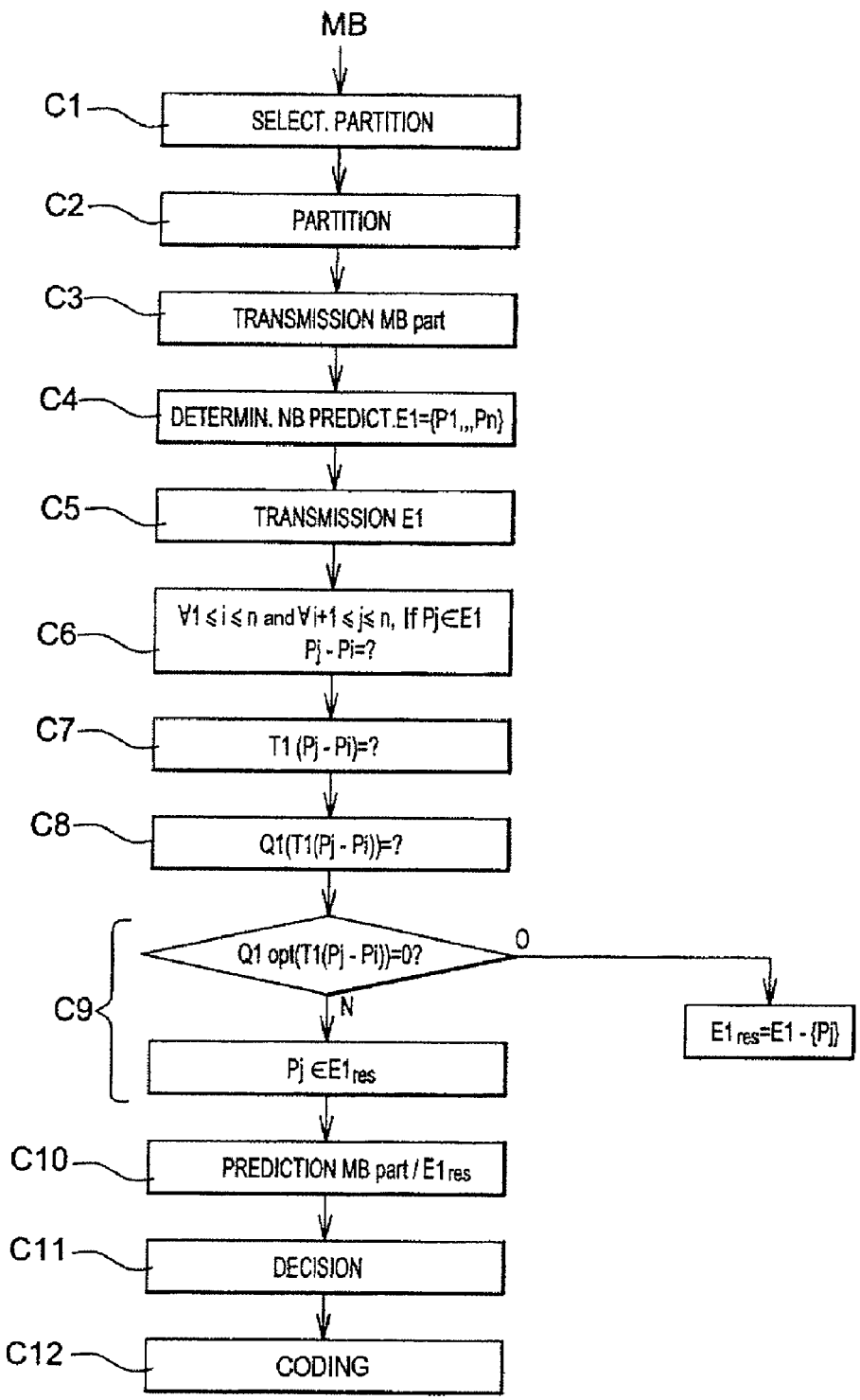
FIG. 1 represents the steps of the coding method according to the invention.

The first step C1, represented in FIG. 1, is the selection, for a macroblock belonging to an image IE of the sequence of images to be coded, of a smaller particular partition chosen from a predetermined set of partitions of predetermined form. For this, a macroblock MB belonging to the image IE, for example of size 16×16, is applied as input to a partition selection module SP, represented in FIG. 2.

This partition selection module SP uses, for example, a method of choice based on exhaustive competition or even a method of choice using an algorithm with bias. Such methods are well known to those skilled in the art (cf: G. J. Sullivan and T. Wiegand, "Rate-distortion optimization for video compression", *IEEE Signal Proc. Mag.*, pp. 74-90, 1998). They will therefore not be described later.

Said partitions are grouped in a database BD of the coder CO. Such partitions can be of any form.

Different partitions of a macroblock that are likely to be selected by the selection module SP are represented as non-limiting examples in FIG. 3.

FIG. 3A represents an initial partition PA1 that has the form of a square.

FIG. 3B represents an initial partition PA1 that has the form of a line.

The next step C2 represented in FIG. 1 is the subdividing of the macroblock MB according to a chosen initial partition PA1, such as one of those represented in FIG. 3, into n partitions PA1, PA2, . . . , PAn. Such a subdividing is performed by a macroblock partitioning module PMB1 represented in FIG. 2 which uses a partitioning algorithm or which performs the partitioning according to predetermined partitions.

FIG. 4 represents the macroblocks MBpart which have been obtained after subdividing according to the initial partitions PA1 represented in FIG. 3.

FIG. 4A represents a partitioned macroblock MBpart comprising four partitions PA1, . . . , PA4, all having the form of a square and the same number of pixels.

FIG. 4B represents a partitioned macroblock MBpart comprising four partitions PA1, . . . , PA4, all having the form of a line and the same number of pixels.

During a step C3 represented in FIG. 1, the partitioning module PMB1 transmits the macroblock MBpart that has just been partitioned to a calculation module CAL1 represented in FIG. 2.

During a step C4 represented in FIG. 1, the calculation module CAL1 determines a number E1 of spatial predictors to be used to calculate the various possible predictions of the partitioned macroblock MBpart received. In the case, for example, in which the intra coding mode is of 8×8 type, as represented in FIG. 4A, the calculation module CAL1 determines, in a manner known per se, that there are nine possible spatial predictors P1, P2, . . . , P9.

Figure 5:
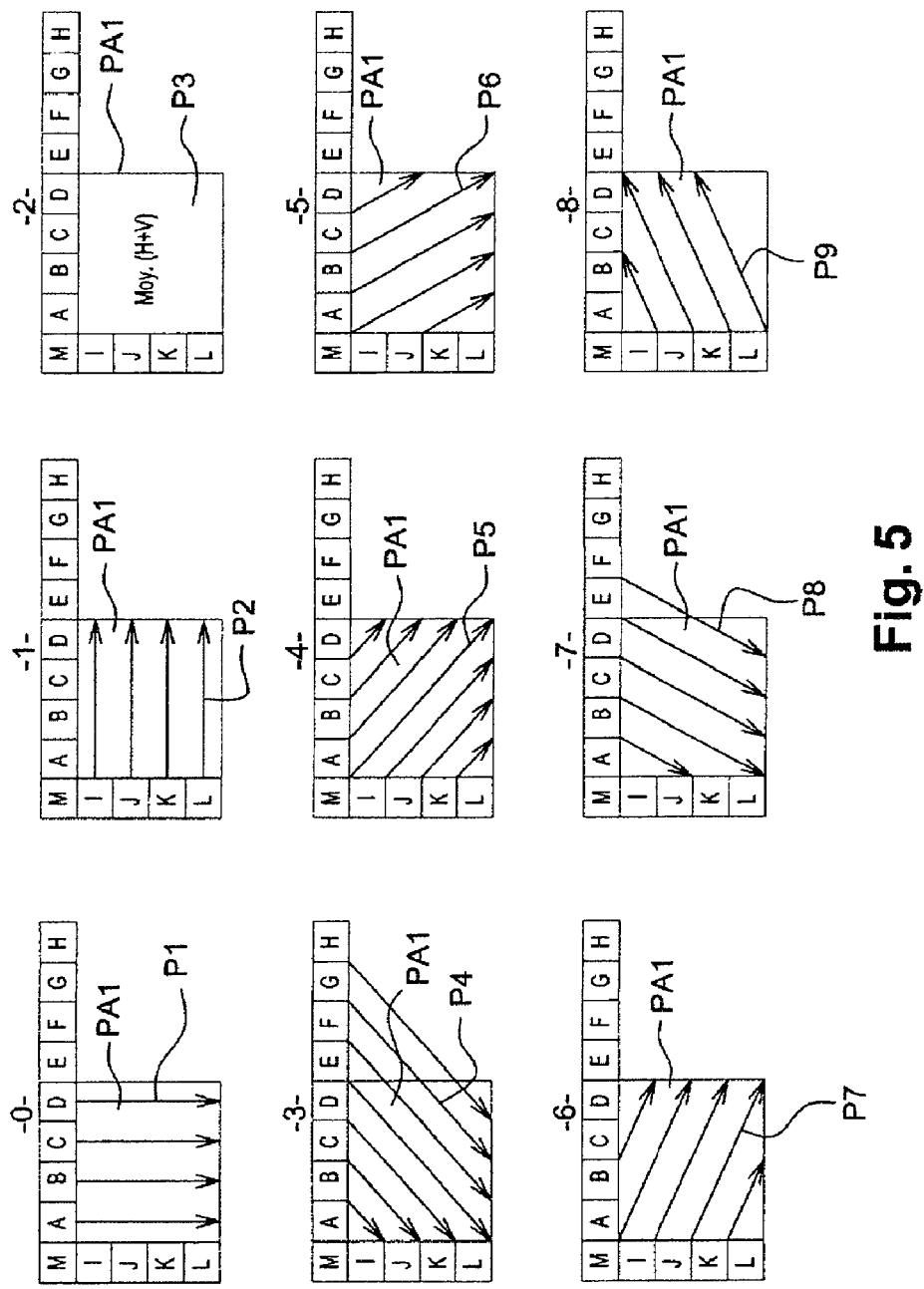
FIG. 5 represents the spatial predictors used in the case of the intra coding mode of FIG. 3A.

Referring to FIG. 5, these nine spatial predictors respectively correspond to nine possible directions relative to which a current partition PA1, PA2, PA3 or PA4 can be predicted relative to a reference partition contained in the same image. These nine directions conventionally comprise:
  the vertical direction P1,
  the horizontal direction P2,
  the DC direction, P3, which is an average of the preceding two directions,
  several diagonal directions P4 to P9.

Referring to FIG. 2, such a reference partition is coded in accordance with the H.264/MPEG-4AVC standard, that is to say that it undergoes, in a manner known per se:
  a coding by discrete cosine transform and quantization which is performed by a transform and quantization module MTQ1,
  then a decoding by reverse discrete cosine transform and reverse quantization, which is performed by the reverse transform and quantization module MTQI1.

According to the invention, during a step C5, the calculation module CAL1 transmits the set E1 of the calculated predictors to a module for eliminating predictors MELP1, the function of which is to delete the redundant spatial predictors from this set, that is to say, the predictors likely to culminate in similar codings.

To this end, the module MELP1 performs the following algorithm for the set E1 containing the above-mentioned nine spatial predictors P1, . . . , Pj, . . . , P9.

For $1 \leq i \leq 9$ and for $2 \leq j \leq 9$, the module MELP1 calculates, during a step C6, the difference Pj−Pi.

During a step C7, the module MELP1 applies a transform to the calculated difference T1 (Pj−Pi).

Such a transform is, for example, a discrete cosine transform such as that used for the above-mentioned coding and decoding of the reference partitions.

As a variant, other known transforms can be used, in particular the discrete wavelet transform, fractal wavelet transform and other transforms.

During a step C8, the module MELP1 performs the following quantization operation on the transform coefficients obtained: Q1(T1(Pj−Pi)).

The quantization operation consists of a matrix with coefficients that can be of the psycho-visual, planar, and other types.

During a step C9, the module MELP1 compares the result of the quantization obtained to a predetermined value q1 as follows:
ti $Q1(T1(Pj-Pi)) \leq q1$ In practice, the module MELP1 calculates the following equation:

$$Q1opt(T1(Pj-Pi))=0$$

in which Q1opt defines a matrix whose coefficients are chosen so as to obtain an optimum elimination of the predictors from the set E1.

The quantization matrix Q1opt uses a quantization step QP1opt which, according to one embodiment of the invention, is fixed empirically for each intra coding mode used.

It has been assessed, after approximation, that for each intra mode, QP1opt lies within the following range:
  $0 \leq QP1opt \leq QP1+6$ in which QP1 is the quantization step of the quantization used for the above-mentioned coding and decoding of the reference partitions.

Figure 6:
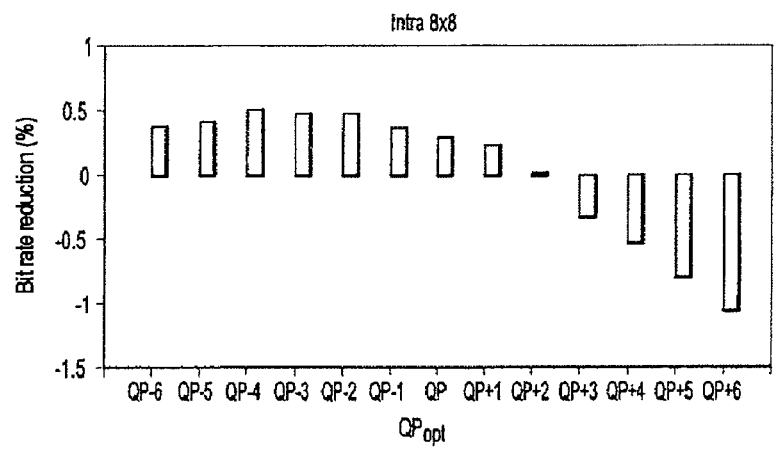
FIG. 6 represents a criterion for optimizing the number of predictors to be eliminated.

As can be seen in FIG. 6, in the case of the 8×8 intra coding mode, by making QP1opt vary over a set of images, a maximum reduction of the bit rate is obtained when QP1opt=4.

During the abovementioned step C9:
  if the equation Q1opt(T1(Pj−Pi))=0 is satisfied, the module MELP1 eliminates the predictor Pj from the set E1 of the predictors E1res=E1−{Pj},
  if the equation Q1opt(T1(Pj−Pi))=0 is not satisfied, that is to say, Q1opt(T1(Pj−Pi))≠0, the module MELP1 retains the predictor Pj in memory.

During a step C10, a prediction calculation module PRED1 (FIG. 1) calculates the possible spatial predictions of each partition PA1, . . . , PAn of the macroblock MBpart, relative to a restricted set of predictors E1res comprising only the predictors that have not been previously eliminated. Such an arrangement thus offers the main advantage of making it possible to obtain a reduction in the cost of the index of the predictor or predictors, which index is intended to be transmitted to the decoder DO represented in FIG. 7.

Once the various possible predictions have been calculated by the prediction calculation module PRED1, during a step C11 represented in FIG. 1, a decision module DCN1, represented in FIG. 2, browses through the partitioned macroblocks of the image IE and chooses, in this step C11, the predictor used to code each of these macroblocks. From the possible predictions for a macroblock, the decision module DCN1 chooses the optimum prediction according to a bit rate distortion criterion well known to those skilled in the art.

For a current macroblock MB to be coded, the decision module DCN1 places the predictors of the restricted set of predictors E1res in competition.

Each predicted macroblock MBpred is then coded, during a step C12, as in the H.264/MPEG-4 AVC standard.

Once this structural coding has been performed by the decision module DCN1, the coefficients of the remainders, if any, corresponding to the blocks of the image IE, are sent to the transform and quantization module MTQ1, to undergo discrete cosine transforms followed by a quantization. The slices of macroblocks with these quantized coefficients are then transmitted to the entropic coding module CE, to produce, with the other images of the video sequence already coded in the same way as the image IE, a video bit stream F, coded according to the invention.

The duly coded bit stream F is transmitted via a communication network to a remote terminal. The latter includes the decoder DO represented in FIG. 7.

The bit stream F is first sent to an entropic decoding module DE, providing a reverse decoding of that performed by the entropic coding module CE represented in FIG. 2. Then, for each image macroblock to be reconstructed, the coefficients decoded by the module DE are sent to a reverse quantization and reverse transform module MQTI2.

Figure 8:
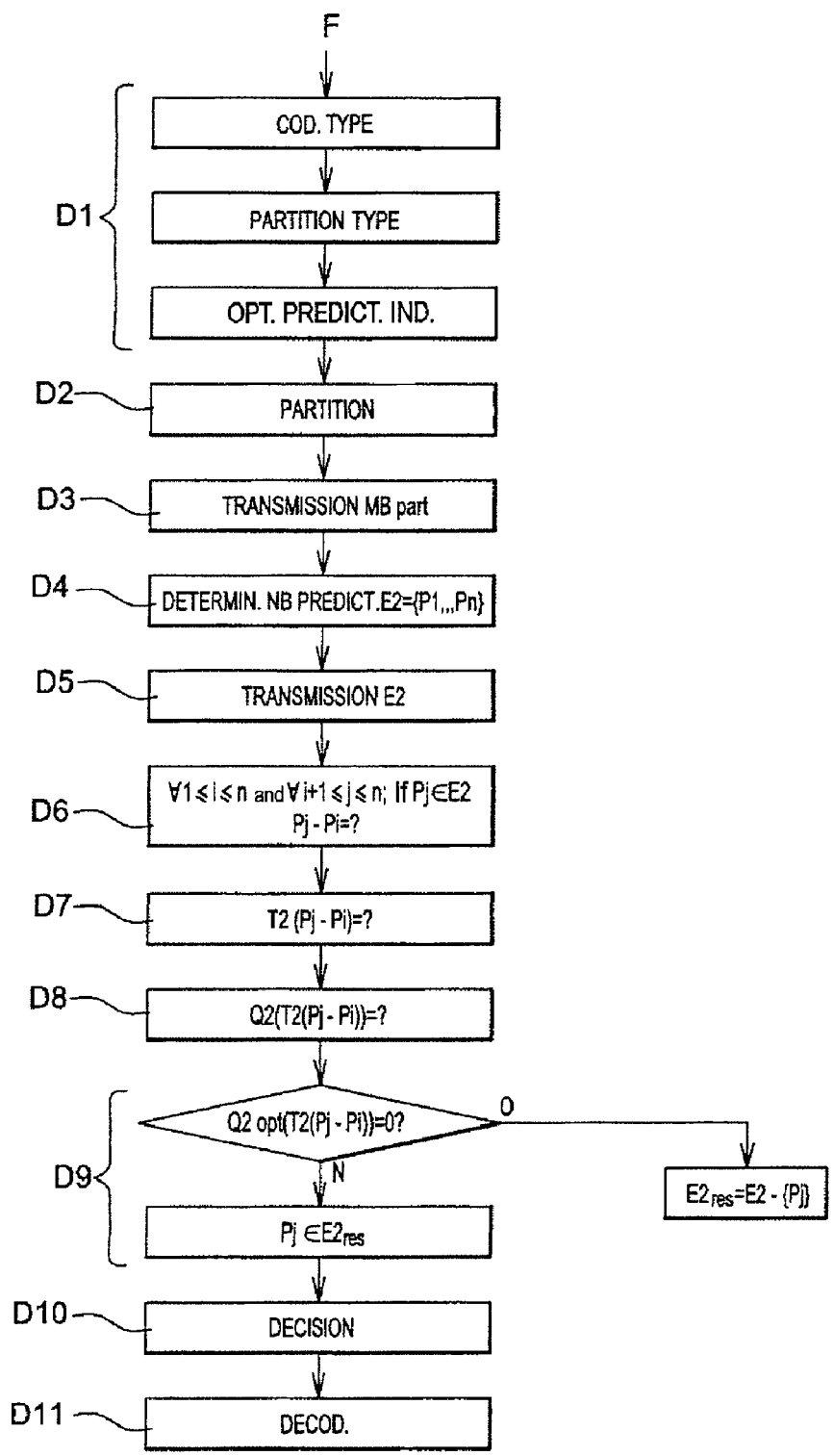
FIG. 8 represents steps of the decoding method according to the invention.

An image reconstruction module R1 then receives decoded data corresponding to the data produced by the module DCN1 (FIG. 2) in the coding step C12 according to the invention, transmission errors apart. The module R1 implements steps D1 to D11 of the decoding method according to the invention, as represented in FIG. 8.

The first step D1 is the decoding of coded data structures in a slice of a current macroblock of the image IE to be decoded. In a manner known per se, the reconstruction module R1 determines, from data of said macroblock section:

the type of coding of said data, Intra or Inter: Intra in the embodiment described.

the type of partitioning of the macroblock to be reconstructed, 4×4 Intra, 8×8 Intra, line, etc.: 8×8 Intra in the embodiment described.

the index of the optimum predictor as selected by the decision module DCN1 in the step C11.

The following step D2 represented in FIG. 8 is the subdividing of the current macroblock to be decoded, in accordance with the partitioning determined in the step D1. To this end, a macroblock partitioning module PMB2, which in all respects resembles that represented in FIG. 2, subdivides the macroblock into a plurality of n partitions PA1, PA2, . . . , PAn.

Figure 7:
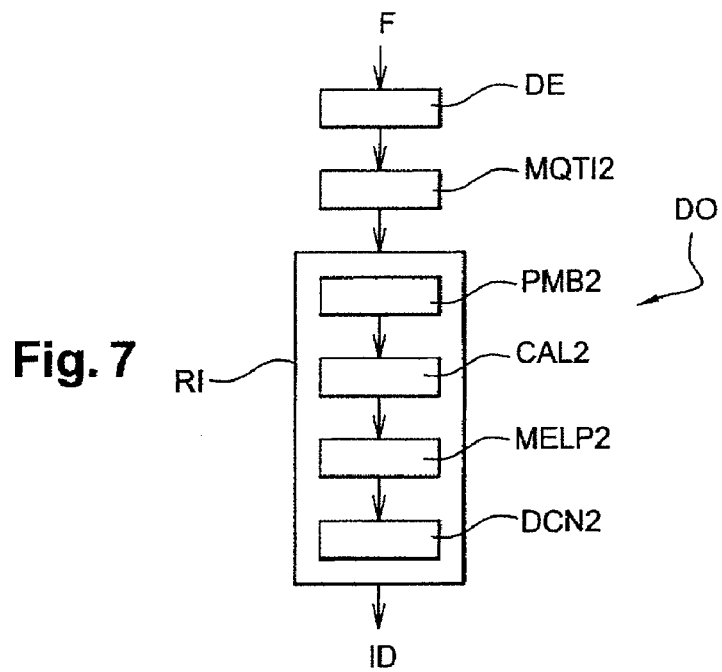
FIG. 7 represents a decoding device according to the invention.

Following the partitioning step D2, during a step D3 represented in FIG. 8, the partitioning module PMB2 transmits the current macroblock to be decoded and which has just been partitioned into n partitions, to a calculation module CAL2 represented in FIG. 7, which is in all respects similar to the calculation module CAL1 of the coder CO of FIG. 1.

During a step D4 represented in FIG. 8, the calculation module CAL2 determines the number E2 of spatial predictors to be used to calculate the various possible predictions of the partitioned macroblock MBpart received.

During a step D5, the calculation module CAL2 transmits the set E2 of the calculated predictors to a module for eliminating predictors MELP2, which is in all respects similar to the module for eliminating predictors MELP1 of the coder CO of FIG. 1.

During steps D6 to D9, the module for eliminating predictors MELP2 performs the same algorithm as that performed by the module MELP1 of the above-mentioned coder CO, to delete the redundant spatial predictors from the set E2, that is to say, the predictors likely to culminate in similar decodings, and obtain a reduced set E2res of predictors.

During a step D10 represented in FIG. 8, a decision module DCN2, represented in FIG. 7, browses through the partitioned macroblocks and chooses a predictor to decode each of these macroblocks. From the possible predictions for a macroblock, the decision module DCN2 chooses the optimum prediction according to a bit rate distortion criterion well known to those skilled in the art.

For a current macroblock MB to be decoded, the decision module DCN2 places the predictors of the restricted set of predictors E2res in competition.

Each predicted macroblock is then decoded, during a step D11, as in the H.264/MPEG-4 AVC standard.

Once all the macroblocks of the image IE have been decoded, the image reconstruction module R1 supplies as output from the decoder DO, an image ID corresponding to the decoding of the image IE.

Given the fact that the algorithm for eliminating predictors performed in the decoder DO is in all respects the same as that performed in the coder CO, the cost of the information incurred by the predictors used is greatly reduced.

DETAILED DESCRIPTION OF A SECOND EMBODIMENT

The second embodiment described hereinbelow is distinguished from the previous one by the fact that the coding device CO represented in FIG. 2 performs an Inter-type coding instead of an intra-type coding.

One aim of the second embodiment is to manage, for each block to be coded, to eliminate the subpixel resolution so as to reduce the cost of the displacement vectors concerned.

In a manner similar to the preceding step C1 of the intra mode, the selection module SP selects partitions which, in the example described, all have the form of a block.

In a manner similar to the preceding step C2 of the intra mode, a current macroblock is subdivided according to n partitions, for example into sixteen 4×4 blocks.

The next step C3 is the same as that performed during the abovementioned intra coding.

In the next step C4, a calculation module CAL1 of the prediction module PRED1 determines the number of predictors, no longer spatial predictors but temporal predictors, to be used to calculate the various possible predictions of a current 4×4 block.

Figure 9:
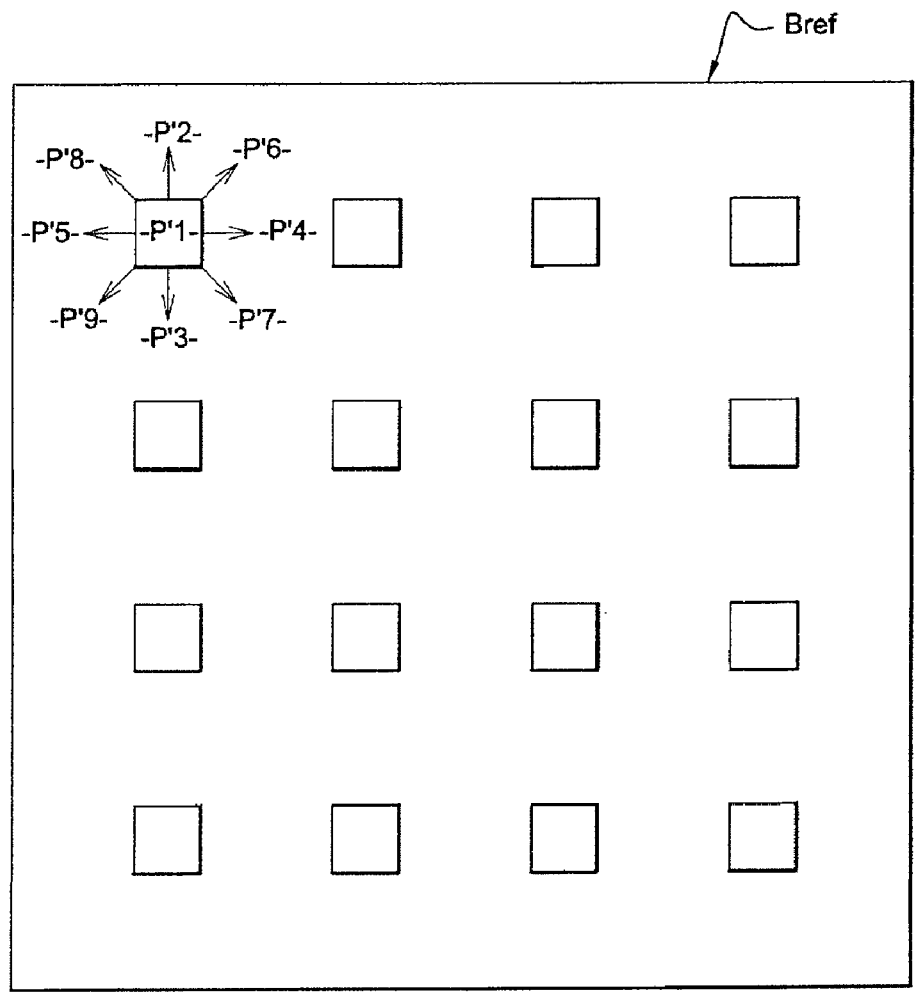
FIG. 9 represents the temporal predictors used in the case of the 4×4 inter coding, with half-pixel resolution.

In a manner known per se, the calculation module CAL1 determines the various directions taken by the displacement vector which describes the movement between the current block and a reference block Bref represented in FIG. 9. The reference block Bref belongs to a reference image, for example the preceding image of the sequence. In the case, for example, where the displacement vector is split to the half-pixel, in a manner known as such, the calculation module CAL1 calculates in total, for a reference pixel, the following nine predictors, as represented in FIG. 9:
P'1: vector to the whole pixel,
P'2: vector to the ½ pixel in the upward vertical direction,
P'3: vector to the ½ pixel in the downward vertical direction,
P'4: vector to the ½ pixel in the right horizontal direction,
P'5: vector to the ½ pixel in the left horizontal direction,
P'6: vector to the ½ pixel in the right upward diagonal direction,
P'7: vector to the ½ pixel in the right downward diagonal direction,
P'8: vector to the ½ pixel in the left upward diagonal direction,
P'9: vector to the ½ pixel in the left downward diagonal direction.

In a manner similar to the abovementioned step C5, the calculation module CAL1 transmits the set E'1 of the calculated vectors P'1 to P'9 to the module for eliminating predictors MELP1.

In a manner similar to the steps C6 to C9 of the Intra mode, the elimination module MELP1 performs the following algorithm for the set E'1 containing the abovementioned nine temporal predictors P'1, ..., P'j, ..., P'9.

In practice, the module MELP1 calculates the following equation:

$$Q'1opt(T'1(P'j-P'1))=0 \text{ for } 2 \leq j \leq n$$

in which Q'1opt defines a matrix whose coefficients are chosen so as to obtain an optimum elimination from the set E'1 of the vectors to the half-pixel.

The quantization matrix Q'1opt uses a quantization step QP'1opt which, according to one embodiment of the invention, is set empirically for each inter coding mode used.

It has been assessed after approximation that, in the case of the 4×4 inter mode, with resolution to the half-pixel, a maximum compression was obtained with QP'1opt=17.

During the abovementioned step C9:
if the equation Q'1opt(T'1(P'j−P'1))=0 is satisfied M times, for example for half of the vectors to the half-pixel concerned, the module MELP1 eliminates from the set E'1 all the predictors P'2 to P'9 to the half-pixel, so as to obtain a reduced set of predictors, namely a set E'1res=P'1 which is reduced to the vector P'1 to the whole pixel,
if the equation Q'1opt(T'1(Prj−P'1))=0 is not satisfied, the module MELP1 retains the predictor P'j in memory.

The following steps for choosing the optimum prediction C11 and for coding C12 are respectively similar to the abovementioned steps C11 and C12 of the Intra mode and, for this reason, will not be described again.

The reconstruction module R1 of the decoder DO then implements steps D1 to D11 similar to those of the decoding method described above for the Intra mode, but this time suited to the Inter mode.

The first step D1 is the decoding of data structures coded in a section of a current macroblock of the image IE to be decoded. In a manner known per se, the reconstruction module R1 determines, from the data of said macroblock section:
the type of coding of said Inter data, in the embodiment described,
the type of partitioning of the macroblock to be reconstructed, 4×4 Inter in the embodiment described,
the index of the optimum displacement vector as selected by the decision module DCN1 in the step C11.

During the next step D2, the macroblock partitioning module PMB2 subdivides the macroblock into sixteen 4×4 blocks.

Following the partitioning step D2, during a step D3 similar to the abovementioned one of the Intra mode, the partitioning module PMB2 transmits the current macroblock to be decoded and that has just been partitioned into sixteen partitions, to the abovementioned calculation module CAL2.

The calculation module CAL2 determines, during a step D4, the number E'2 of temporal predictors to be used to calculate the various possible predictions of the partitioned macroblock MBpart received.

During a step D5, the calculation module CAL2 transmits the set E'2 of the nine calculated displacement vectors P'1 to P'9 to the abovementioned module for eliminating predictors MELP2.

During steps D6 to D9, the module for eliminating predictors MELP2 performs the same algorithm as that performed by the module MELP1 of the above-mentioned coder CO, to delete the vectors to the half-pixel from the set E'2, and thus obtain a reduced set E2res which now comprises only the vector to the whole pixel P'1.

During a step D10, the decision module DCN2 browses through the partitioned macroblocks and chooses a vector to decode each of these macroblocks. Out of the possible predictions for a macroblock, the decision module DCN2 chooses the optimum displacement vector according to a bit rate distortion criterion well known to those skilled in the art.

For a current macroblock MB to be decoded, the decision module DCN2 places the vectors of the restricted set of predictors E'2res in competition. Given the fact that E'2res contains only the vector P'1, the decision module DCN2 selects this vector by default.

Each predicted macroblock is then decoded, during the step D11, as in the H.264/MPEG-4 AVC standard.

Once all the macroblocks of the image IE have been decoded, the image reconstruction module R1 supplies as output from the decoder DO, an image ID corresponding to the decoding of the image IE.

Given the fact that the algorithm for eliminating predictors performed on the decoder DO is in all respects the same as that performed on the coder CO, the cost of the information incurred by the vectors to the half-pixel used is greatly reduced.

It goes without saying that the embodiments that have been described above have been given purely as an indication and are in no way limiting, and that numerous modifications can easily be made by those skilled in the art without in any way departing from the context of the invention.

Thus, for example, the quantization operations Q1 (respectively Q2) used to eliminate a certain number of predictors calculated for the coding (respectively the decoding) can undergo post-processing operations in the same way as the quantization operation performed at the time of coding (respectively of decoding). An example of such post-processing consists, for example, in setting to zero all the coefficients of the quantization matrix when the coefficients are mostly equal to zero.

Concerning the second embodiment, it is also possible to take into account, in addition to the displacement vectors to the half-pixel, the displacement vectors to the quarter of a pixel and/or to the eighth of a pixel, . . . , and/or to the nth of a pixel. The choice of one or more types of splitting of the displacement vector will be made according to the resolution of the image to be coded.

The invention claimed is:

1. A method of coding an image or a sequence of images generating a data stream comprising data representative of at least one group of pixels in one of said images, said method comprising the steps of:
   calculating a predetermined number of predictors in relation to said group of pixels,
   selecting an optimum predictor relative to a predetermined criterion of choice, said method further comprising, between said calculation and selection steps, a step of eliminating at least one predictor from said calculated predetermined number, which comprises, for at least two $i^{th}$ and $j^{th}$ predictors:
   calculating a difference between said $j^{th}$ and $i^{th}$ predictors,
   applying a transform to said calculated difference,
   performing a quantization operation on a result of the applied transform,
   comparing a result of said quantization operation to a predetermined value,
   eliminating the $j^{th}$ predictor in the case where the result of said quantization operation is less than or equal to said predetermined value.

2. The coding method as claimed in claim 1, during which the quantization operation is determined according to a criterion for optimizing the number of predictors to be eliminated.

3. The coding method as claimed in claim 1, wherein the quantization operation uses, as parameter, the quantization step which is itself used by a quantization operation performed during the coding.

4. The coding method as claimed in claim 1, wherein the predictors are of spatial or temporal type.

5. A non-transitory computer program product comprising instructions for implementing the method as claimed in claim 1, when it is executed on a computer.

6. A method of decoding a data stream representative of an image or of a sequence of images, said stream comprising data representative of at least one group of pixels in one of said images, said method comprising the steps of:
   reading an optimum predictor index contained in said stream, said index being a function of a predetermined number of predictors in relation to said group of pixels,
   calculating said optimum predictor from the index read,
said method, prior to the reading step, further comprising
   calculating said predetermined number of predictors,
   for at least two $i^{th}$ and $j^{th}$ predictors, calculating a difference between said $j^{th}$ and $i^{th}$ predictors,
   applying a transform to said calculated difference,
   performing a quantization operation on a result of the applied transform,
   comparing a result of said quantization operation to a predetermined value,
   eliminating the $j^{th}$ predictor in the case where the result of said quantization operation is less than or equal to said predetermined value, so that said optimum predictor index read during said reading step is a function of a reduced number of predictors.

7. The decoding method as claimed in claim 6, during which the quantization operation is determined according to a criterion for optimizing the number of predictors to be eliminated.

8. The decoding method as claimed in claim 6, wherein the quantization operation uses, as parameter, the quantization step which is itself used by a quantization operation performed during the decoding.

9. The decoding method as claimed in claim 6, wherein the predictors are of spatial or temporal type.

10. A non-transitory computer program product comprising instructions for implementing the method as claimed in claim 6, when it is executed on a computer.

11. A device for coding an image or a sequence of images generating a data stream comprising data representative of at least one group of pixels in one of said images, said device comprising:
   a module for calculating a predetermined number of predictors in relation to said group of pixels,
   a decision module for determining an optimum predictor relative to a predetermined criterion of choice,
said device further comprising:
   a module for eliminating at least one predictor from said predetermined number which comprises a calculation module for, relative to at least two $i^{th}$ and $j^{th}$ predictors:
   determining a difference between said $j^{th}$ and $i^{th}$ predictors,
   applying a transform to said calculated difference,
   performing a quantization operation on a result of the applied transform,
   comparing a result of said quantization operation to a predetermined value,
   eliminating the $j^{th}$ predictor in the case where the result of said quantization operation is less than or equal to said predetermined value.

12. A device for decoding a data stream representative of an image or of a sequence of images, said stream comprising data representative of at least one group of pixels in one of said images, said device comprising:
   a module for reading an optimum predictor index contained in said stream, said index being a function of a predetermined number of predictors in relation to said group of pixels,
   a module for calculating said optimum predictor from the index read,
said device further comprising:
   a module for calculating said predetermined number of predictors,
   a module for eliminating at least one predictor from said predetermined number which comprises:
   a calculation module for, relative to at least two $i^{th}$ and $j^{th}$ predictors:
      determining a difference between said $j^{th}$ and $i^{th}$ predictors,
      applying a transform to said calculated difference,
      performing a quantization operation on a result of the applied transform,
      comparing a result of said quantization operation to a predetermined value,
      eliminating the $j^{th}$ predictor when the result of said quantization operation is less than or equal to said predetermined value,
   a transmitter for transmitting the reduced predetermined number of predictors obtained to said read module.

* * * * *